United States Patent [19]

Christ et al.

[11] 4,073,549
[45] Feb. 14, 1978

[54] HYDROSTATIC SUPPORTING DEVICE

[75] Inventors: Alfred Christ, Zurich; Rolf Lehmann, Mutschellen; Helmut Miller, Niederrohrdorf, all of Switzerland

[73] Assignee: Escher Wyss Limited, Zurich, Switzerland

[21] Appl. No.: 744,253

[22] Filed: Nov. 23, 1976

[30] Foreign Application Priority Data

July 14, 1976 Switzerland ............................ 9004/76
Dec. 2, 1975 Switzerland ........................ 15610/75

[51] Int. Cl.² ............................................. F16C 32/06
[52] U.S. Cl. .......................................................... 308/9
[58] Field of Search ........................ 308/5 R, 9, 35, 72, 308/73, 122; 184/5; 29/113 AD, 116 AD

[56] References Cited

U.S. PATENT DOCUMENTS

| | | | |
|---|---|---|---|
| 3,658,393 | 4/1972 | Luthi | 308/9 |
| 3,791,703 | 2/1974 | Ifield | 308/9 |
| 3,799,628 | 3/1974 | Gaasbeek et al. | 308/9 |
| 3,994,367 | 11/1976 | Christ | 308/9 |

Primary Examiner—Trygve M. Blix
Assistant Examiner—Charles E. Frankfort
Attorney, Agent, or Firm—Robert A. Ostmann

[57] ABSTRACT

Hydrostatic apparatus for supporting a mobile part which moves relatively to a foundation comprises a bearing shoe having a bearing face containing a pressure pocket, and a hydraulic servomotor which exerts on the shoe a force urging it toward the mobile part. A support element connected with the shoe and the foundation positively holds the shoe against movement in at least one direction along its supporting axis, and its restraint is so correlated with the pressure forces acting on the shoe that the latter is rendered non-displaceable. Depending upon the relative magnitudes of the forces developed by the servomotor and by the pressure acting on the bearing face, the support element may normally be unloaded, loaded in tension or loaded in compression. In the first case, the support element prevents movement of the shoe in opposite directions along the support axis, whereas in the second and third cases it may permit movement of the shoe toward and away from the foundation, respectively.

19 Claims, 5 Drawing Figures

HYDROSTATIC SUPPORTING DEVICE

BACKGROUND OF THE INVENTION

This invention relates to hydrostatic apparatus for supporting a mobile part which moves relatively to a foundation and which comprises a bearing shoe having a bearing face containing a pressure pocket, a hydraulic servomotor which urges the shoe in the direction of the mobile part, and supply means for delivering hydraulic fluid under pressure to the pocket and the servomotor.

One apparatus of the type just mentioned is disclosed in U.S. Pat. No. 3,802,044, issued Apr. 9, 1974. In that proposal, the bearing shoe follows all displacements of the supported part, and the supporting force it furnishes is constant. Thus, in that apparatus, the position of the part being supported determines the position of the bearing shoe. This floating characteristic renders the apparatus unsuitable for applications in which the supported part must be held at a predetermined position relative to the foundation.

Another apparatus of the type under discussion is disclosed in U.S. application Ser. No. 588,582, filed June 19, 1975 (now U.S. Pat. No. 3,994,367, issued Nov. 30, 1976). This apparatus includes a spring which reacts between the shoe and the foundation, so it furnishes a supporting force which increases and decreases, respectively, as the mobile part moves toward and away from the foundation. However, it is not capable of maintaining the mobile part in a precise position relative to the foundation in situations where forces, other than weight, act in the supporting direction.

SUMMARY OF THE INVENTION

The object of the present invention is to provide an improved hydrostatic supporting apparatus which is able to maintain the supported part in a prescribed position under variable loading conditions. According to the invention, this object is achieved by including in apparatus of the kind first mentioned a supporting element which positively holds the shoe against movement in at least one direction along the axis of support, and this restraint is so correlated with the pressure forces acting on the shoe that the latter is rendered non-displaceable under normal operating conditions.

In one version of the improved apparatus, the pressure forces developed by the servomotor and by the pressure acting on the bearing face of the shoe are equal when the mobile part is in a desired position relative to the foundation, and the support element is constructed to hold the shoe against movement in opposite directions. Thus, when the mobile part is in the desired position, the support element is unloaded. However, when the mobile part moves toward or away from the foundation, that element is loaded in compression or tension and positively prevents the shoe from following. As a result, the supporting force furnished by the shoe increases or decreases, depending upon the direction of displacement, and the mobile part is returned to the desired position.

According to another embodiment of the invention, the pressure force developed by the servomotor always is the greater of the two forces, and the support element is constructed as a tension member which is preloaded by the differential between the pressure forces. Displacement of the mobile part increases or decreases the tensile load in the support element, but never completely relieves the load. Therefore, as in the first version, the shoe is rendered non-displaceable, and the supporting force changes in the sense required to return the mobile part to the desired position.

In the case of the embodiment just mentioned, the support element may be arranged to permit free movement of the shoe in the direction of the foundation, and the apparatus may include an auxiliary bearing for supporting the shoe on the foundation after the tensile load in the support element is completely relieved. With this arrangement, the bearing shoe is supported adequately in the event of failure of the supply of pressure medium for the servomotor, yet the support element, which is constructed as a tension member, need not accept compressive load.

The embodiment which employs a support element preloaded in tension may advantageously be employed as a counter-bearing for a main bearing. In this case, the apparatus includes means which responds to the position of the mobile part and serves to control the supply of pressure medium to the bearing pocket and the servomotor. When the main bearing is supporting the mobile part, the support element holds the shoe at a predetermined distance from the mobile part, and the control means shuts off the supply of pressure medium. However, when the mobile part moves toward the shoe, and the main bearing consequently ceases to support, the control means permits pressure medium to be delivered to the pocket and the servomotor, and the apparatus commences to perform its normal supporting function.

In a further version of the supporting apparatus, the pressure force developed on the bearing face always is the greater of the two forces, and the support element is constructed as a compression member which is preloaded by the force differential. Here too, displacements of the mobile part vary, but do not relieve, the load in the support element. Therefore, as in the other embodiments, the shoe is non-displaceable under ordinary operating conditions, and the supporting force it furnishes changes in the sense needed to effect return of the mobile part to its normal position.

Other features of the improved apparatus are mentioned later in the detailed description.

BRIEF DESCRIPTION OF THE DRAWINGS

Several embodiments of the invention are described herein in detail with reference to the accompanying drawings, which contain simplified schematic illustrations, and in which.

DESCRIPTION OF ILLUSTRATED EMBODIMENTS

Figure 1:
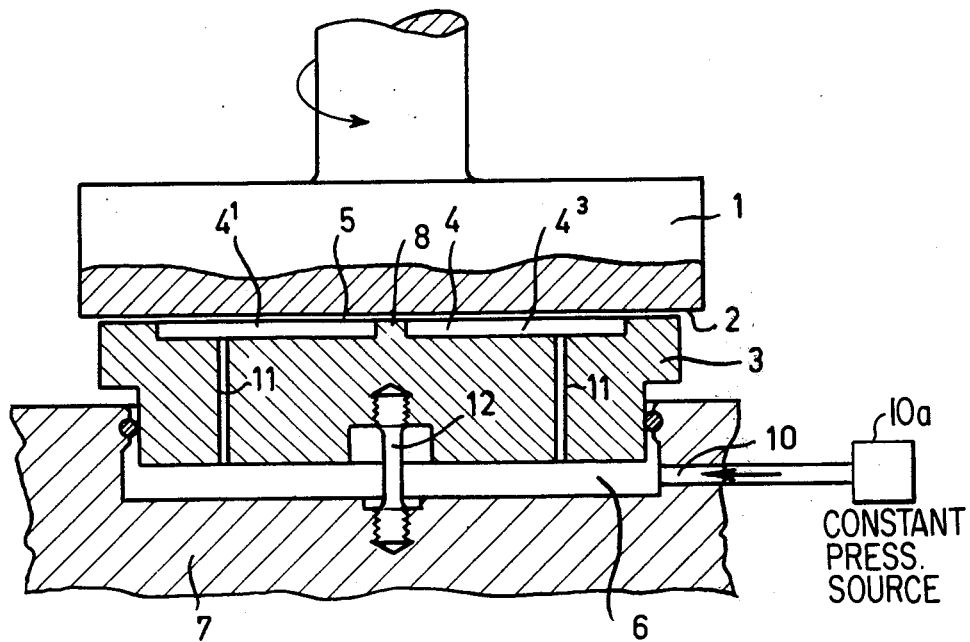
FIG. 1 is an axial sectional view of a supporting apparatus employing a support element which normally is unloaded.

In the embodiment illustrated in FIG. 1 the supporting apparatus is employed to support a part 1 which rotates relatively to a foundation 7 and has a bearing surface 2. Part 1, for example, may be a portion of a hydraulic machine set. The supporting apparatus comprises a bearing shoe 3, provided with a bearing face 5 containing a hydrostatic bearing pocket 4, and a hydraulic servomotor 6. The cylinder of servomotor 6 is formed in foundation 7, and the piston of this motor is defined by the lower portion of shoe 3. The mounting of shoe 3 is such that it may tilt relatively to foundation 6.

Bearing pocket 4 is divided by ledges 8 into four separate, circumferentially spaced compartments $4^1$ to $4^4$, of which only the compartments $4^1$ and $4^3$ appear in the drawing. Each of these compartments is connected with the pressure chamber of servomotor 6 by its own throttling duct 11. That chamber, in turn, is connected with a source 10a of hydraulic fluid at constant pressure by a conduit 10.

Bearing shoe 3 is connected positively to foundation 7 by a support element 12, whose opposite ends are securely screwed into these parts. Element 12 lies along the axis of the pressure forces which act on the upper and lower ends of shoe 3, and, since the shoe may tilt relatively to foundation 7, the support element is formed with a thin rod portion intermediate its ends which is flexible. In lieu of this flexible portion, element 12 may be connected with the shoe and/or the foundation by a joint, such as a universal joint, which affords to shoe 3 the required tilting freedom.

Since hydraulic fluid is delivered to the compartments of pocket 4 through the pressure chamber of motor 6 and the throttling ducts 11, the pressure acting on bearing face 5 of shoe 3 necessarily will be lower than the pressure in servomotor 6. However, the areas of the various portions of face 5 are so selected in relation to the pressures which act on them, that the total pressure force developed on face 5 normally equals the oppositely directed force developed by servomotor 6. Thus, under normal conditions, shoe 3 floats in a position of equilibrium between part 1 and foundation 7, and support element 12 carries no load.

If the mobile part 1 in FIG. 1 moves away from bearing shoe 3, the bearing gap between these parts widens, and the pressure acting on face 5 and surface 2 decreases. This pressure change subjects shoe 3 to a net upward directed pressure force; however, since support element 12, which now is loaded in tension, furnishes an equal and opposite reaction, shoe 3 cannot follow part 1 and restore the bearing gap to its original size. Therefore, the apparatus will allow the supporting force applied to part 1 to decrease. As a result, part 1 will return to its original position.

If mobile part 1 is displaced toward bearing shoe 3, support element 12 will hold the shoe in place, and thus be subjected to compressive load, and the bearing gap will be allowed to decrease. The resulting increase in the pressure in the bearing gap, and consequently in the supporting force, will move part 1 back to its original position.

Figure 2:
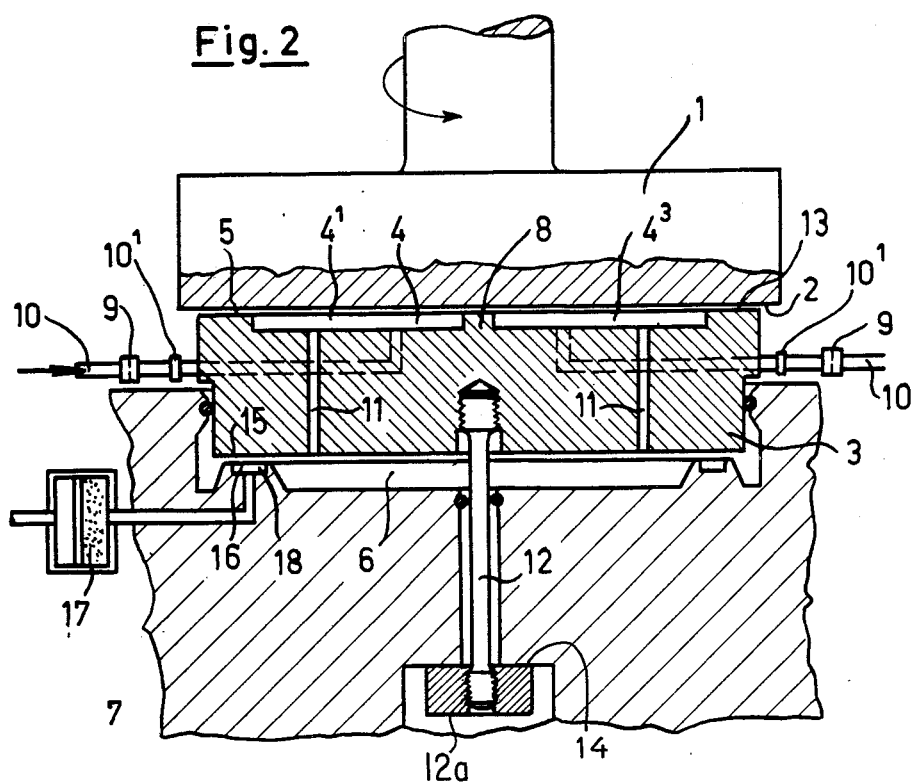
FIG. 2 is an axial sectional view of a supporting apparatus employing a support element constructed as a tension member.

In the embodiment of FIG. 2, each of the compartments $4^1$-$4^4$ of the bearing pocket is connected directly to a source of hydraulic fluid under pressure by its own conduit 10 containing a throttling element 9, and the pressure chamber of servomotor 6 receives hydraulic fluid solely through the throttling ducts 11 which lead from those compartments. The pressures in the bearing compartments and in the servomotor normally are equal. However, the effective areas of bearing face 5 and of the servomotor are so correlated that the motor always develops the greater force. In computing the effective area of face 5 in this embodiment, as well as in the others, the pressure gradient in the edge gap 13 is, of course, taken into account.

The net upward directed pressure force which acts on shoe 3 in the FIG. 2 apparatus is taken up by the support element 12, which, in this case, is constructed as a tension member. As shown, the upper end of element 12 is screwed into shoe 3, and the lower end carries a nut 12a which bears on an abutment 14 formed in foundation 7. Nut 12a and abutment 14 define a one-way force-transmitting link which permits element 12 to move freely in the downward direction. Such a link could also be provided between element 12 and shoe 3. Although element 12 may move freely in one direction relatively to foundation, it nevertheless serves to hold bearing shoe 3 positively and non-displaceably at a predetermined height above the foundation.

The support element 12 of FIG. 2 is subjected to a tensile preload, as a result of the net upward directed pressure force developed on shoe 3. If mobile part 1 moves away from shoe 3, the net force, and consequently the tensile load in element 12, increases, but the shoe does not follow. Therefore, the bearing gap will widen, the supporting force will decrease, and part 1 will return to the desired position. On the other hand, if part 1 approaches shoe 3, the net force will decrease, and so too will the tensile load in element 12. However, this change does not completely relieve the preload in support element 12, so shoe 3 still will be held in its original position. Thus as in the first embodiment, the apparatus will provide an increased supporting force and will effect return of mobile part 1 to the desired position.

The embodiment of FIG. 2 also includes an auxiliary bearing for supporting shoe 3 on foundation 7 under emergency conditions. This bearing comprises cooperating surfaces 15 and 16 which are formed on the parts 3 and 7, respectively, and which normally are spaced apart a predetermined distance. However, if the supply of hydraulic fluid to the apparatus fails and the preload in support element 12 is relieved, these surfaces move into operative engagement and provide support for shoe 3. At this time, a lubricating device 17 forces lubricant under pressure into pockets 18 formed in surface 16. Since surfaces 15 and 16 are within the pressure chamber of servomotor 6, they also are lubricated by the hydraulic fluid which is present in that space, but is no longer under pressure. Under this emergency supporting condition, shoe 3 will, of course, rotate with part 1, and the supply conduits 10 will break at the emergency fracture points indicated at $10^1$.

The auxiliary bearing may be arranged outside the pressure chamber of servomotor 6. In this event, surface 15 could, for example, be located on the underside of a rim provided on shoe 3. Preferably, the foundation bearing surface in this alternative is provided by tiltable bearing shoes, and the cooperating surfaces are located in an annular trough which surrounds shoe 3 and is filled with lubricant. In other words, the auxiliary bearing preferably is constructed as a Mitchell bearing. Since, in this version of the apparatus, the auxiliary bearing is outside the servomotor, it can be operated in a bath of lubricating oil, and water can be used as the pressure medium for the servomotor.

Figure 3:
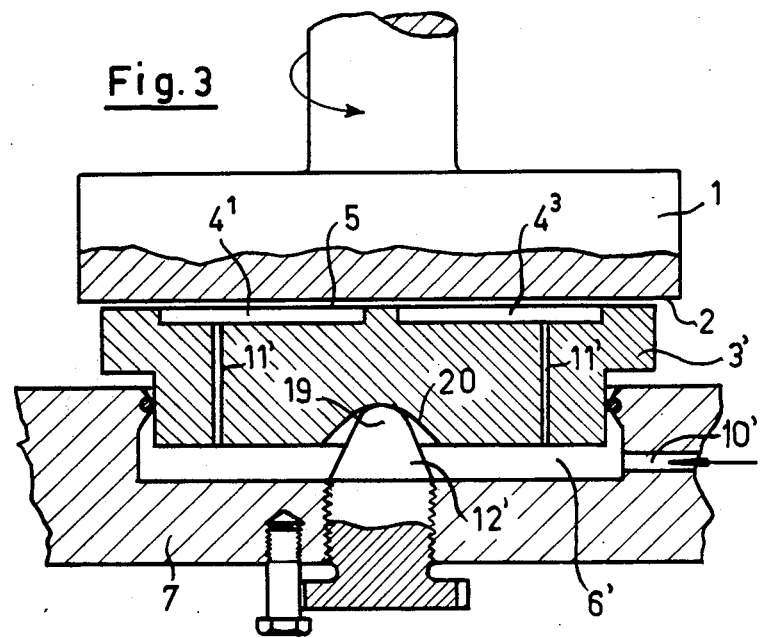
FIG. 3 is an axial sectional view of a supporting apparatus employing a support element constructed as a compression member.

In the apparatus shown in FIG. 3, the servomotor 6' and the compartments of the bearing pocket are supplied with hydraulic fluid under pressure in the same way as in the first embodiment. Thus, the pressure in the servomotor will be higher than the pressure acting on bearing face 5. However, in this version of the invention, the effective areas of face 5 and the servomotor are so chosen that the pressure force developed on face 5 always is greater than the opposing force exerted by servomotor 6'. The difference between these forces is accepted by support element 12', which now is constructed as a compression member. Shoe 3' is carried on element 12' by a knife edge bearing, one part of which is a rounded conical knife edge 19 formed at the upper end of the support element. The other part of this bearing is defined by a cup 20 formed in shoe 3' and having a surface curved on a radius greater than the radius of curvature of knife edge 19. With this arrangement, shoe 3' rolls without friction on support element 12' as its tilts relatively to foundation 7. Preferably, the crown of knife edge 19 lies in the plane of the sealing arrangement provided between shoe 3' and foundation 7.

When the mobile part 1 of the FIG. 3 embodiment is in the desired position, support element 12' is subjected to a predetermined compressive preload as a result of the differential between the opposing forces developed on shoe 3'. If part 1 moves toward foundation 7, the compressive load imposed on element 12' increases, but, of course, shoe 3' does not move. Therefore, the apparatus will afford an increased supporting force which will act to return part 1 to the normal position. If, on the other hand, part 1 moves away from foundation 7, the net downward pressure force will be reduced, but not to such an extend that the compressive load in element 12' is completely relieved. In other words, shoe 3' will remain seated on the support element. Thus, as in the case of the other embodiments, this displacement of part 1 effects a reduction in the supporting force afforded by the apparatus.

Figure 4:
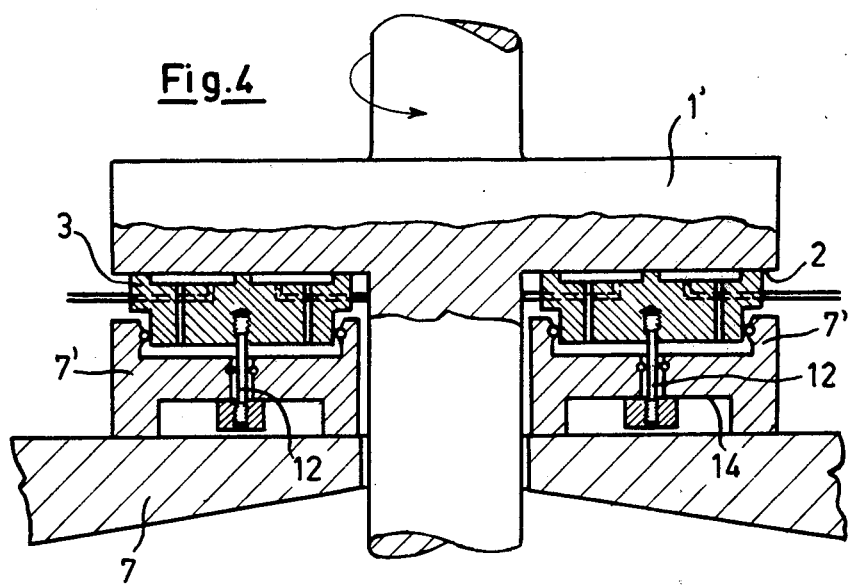
FIG. 4 is an axial sectional view of an embodiment which uses a plurality of the improved supporting devices.

In each of the preceding embodiments, the supporting apparatus employs a single bearing shoe 3 or 3' which is centered on the axis of rotating part 1. This arrangement is desirable, because it keeps friction to an extremely small level. However, other axial bearing arrangements may be used. One of these is shown in FIG. 4, wherein a plurality of the improved supporting devices are arranged in a circular array about the axis of mobile part 1'. Each supporting device is constructed in the manner shown in FIG. 2 and is mounted in its own cup 7' formed in foundation 7.

Figure 5:
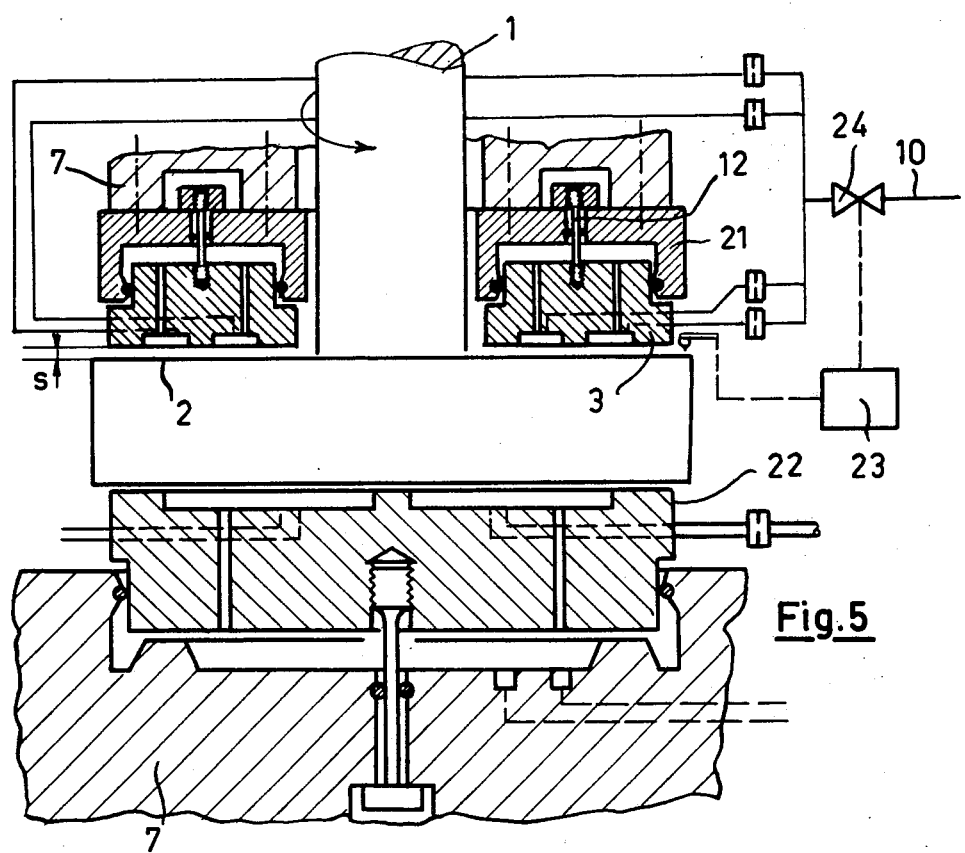
FIG. 5 is an axial sectional view of an embodiment wherein the improved supporting apparatus forms a double-acting axial bearing.

The embodiment of FIG. 5 uses an arrangement similar to the one shown in FIG. 4 as a counter-bearing 21 for a main bearing 22, the latter conforming to the teachings of FIG. 2. The tensile support elements 12 of the counter-bearing hold the associated shoes 3 at a given distance s from the counter-bearing surface 2 of mobile part 1 while main bearing 22 is supporting that part. The supply of hydraulic fluid to the pockets and servomotors of the counter-bearing supporting devices is controlled by a valve 24 which is interposed in supply conduit 10 and is opened and closed by a device 23 which responds to the position of mobile part 1 relative to foundation 7. The control components 23, 24 serve to interrupt the supply of hydraulic fluid to the counter-bearing support devices when surface 2 is spaced from shoes 3 by at least distance s (i.e., when main bearing 22 is supporting part 1), and to open the supply path to those devices when part 1 moves away from the main bearing and the spacing between surface 2 and shoes 3 becomes less than distance s. Control device 23 may sense the position of part 1 directly, as indicated in the drawing, or indirectly, as by responding to the support pressure of the main bearing 22.

It will be observed that, in each of the illustrated embodiments, at least one end of the support element 12 or 12' is provided with an adjustable threaded connection which allows the effective length of the element to be changed. This feature is desirable because its permits precise adjustment of the position of the bearing shoe relative to the foundation.

We claim:

1. Hydrostatic apparatus for supporting a mobile part which moves relative to a foundation and has a bearing surface, the apparatus comprising
   a. a bearing shoe mounted in the foundation and having a bearing face directed toward said bearing surface which contains a bearing pocket;
   b. a hydraulic servomotor having a pressure chamber and serving to urge the shoe toward the mobile part with a force which acts in opposition to a pressure force developed on said bearing face;
   c. supply means for delivering hydraulic fluid under pressure to said pocket and pressure chamber; and
   d. a support element connected with the shoe and the foundation and positively holding the shoe against movement in at least one direction along its supporting axis,
   e. the restraint provided by the support element being so correlated with the relative magnitude of the pressure forces that the shoe is rendered non-displaceable in both directions along the supporting axis.

2. Apparatus as defined in claim 1 in which
   a. the support element positively holds the shoe against movement in opposite directions along the support axis; and
   b. the pressure forces are so correlated that they are equal when the mobile part is in a predetermined position relative to the shoe, the force developed by the servomotor becomes greater as the mobile part moves away from the shoe, and the force acting on the bearing face becomes greater as the mobile part moves in the opposite direction,
   c. whereby the support element is unloaded in said predetermined position of the mobile part and is loaded in tension and compression, respectively, as the mobile part moves away from and toward the shoe.

3. Apparatus as defined in claim 1 in which
   a. the support element positively holds the shoe against movement away from the foundation; and
   b. the pressure forces are so correlated that the force developed by the servomotor always is greater than the force acting on the bearing face regardless of the position of the mobile part relative to the shoe,
   c. whereby the support element always is subjected to a tensile load whose magnitude depends upon the difference between the pressure forces.

4. Apparatus as defined in claim 3 in which said support element is connected with the shoe and the foundation in such a manner that it permits the shoe to move toward the foundation.

5. Apparatus as defined in claim 4 which includes cooperating auxiliary bearing surfaces on the shoe and the foundation, respectively, which are directed towards each other but are spaced apart a predetermined distance during normal operation, the auxiliary bearing surfaces serving to provide emergency support for the shoe upon a failure of the supply means which results in relief of the tensile load in the support element.

6. Apparatus as defined in claim 5 in which said auxiliary bearing surfaces are located within the pressure chamber of the servomotor.

7. Apparatus as defined in claim 5 which includes means for supplying a lubricant to said auxiliary bearing surfaces.

8. Apparatus as defined in claim 1 in which
a. the support element positively holds the shoe against movement toward the foundation; and
b. the pressure forces are so correlated that the force acting on the bearing face always is greater than the force developed by the servomotor regardless of the position of the mobile part relative to the shoe,
c. whereby the support element always is subjected to a compressive load whose magnitude depends upon the difference between the pressure forces.

9. Apparatus as defined in claim 8 in which the support element is connected with the shoe and the foundation in such a manner that it permits the shoe to move away from the foundation.

10. Apparatus as defined in claim 9 in which one of the connections between the support element and the shoe and foundation comprises a knife edge bearing, the knife edge bearing including two cooperating members of which one is a rounded knife edge.

11. Apparatus as defined in claim 10 in which the other member of the knife edge bearing is a cup having a surface curved on a radius larger than the radius of curvature of said rounded knife edge.

12. Apparatus as defined in claim 1
a. which includes ledges which divide said bearing pocket into at least three separate compartments; and
b. in which the supply means comprises a source of hydraulic fluid under pressure, a throttled conduit connecting the source with each of said compartments, and a throttling passage connecting each of said compartments with the pressure chamber of the servomotor.

13. Apparatus as defined in claim 1
a. which includes ledges which divide said bearing pocket into at least three separate compartments; and
b. in which the supply means comprises a source of hydraulic fluid under pressure, a supply passage connecting the source with the pressure chamber of the servomotor, and a throttling passage connecting each of said compartments with the pressure chamber.

14. Apparatus as defined in claim 1 in which
a. the pressure force developed on said bearing face and the pressure force developed by the servomotor act in opposite directions along the same axis; and
b. the support element is coaxial with the axis.

15. Apparatus as defined in claim 1 in which
a. the bearing shoe is mounted in the foundation for tilting movement relatively to the foundation; and
b. the support element is flexible.

16. Apparatus as defined in claim 1 in which
a. the bearing shoe is mounted in the foundation for tilting movement relatively to the foundation; and
b. at least one of the connections between the support element and the shoe and the foundation allows relative tilting motion of the connected parts.

17. Apparatus as defined in claim 1 which includes means for adjusting the length of the support element, whereby the position of the shoe relative to the foundation may be adjusted.

18. Apparatus as defined in claim 1 in which
a. the bearing face of the shoe is circular;
b. the mobile part is a rotor having an end face which serves as said bearing surface; and
c. the shoe is coaxial with the rotor.

19. Apparatus as defined in claim 1 in which
a. the mobile part has a second bearing surface which faces in the opposite direction from the first bearing surface and cooperates with a main bearing device to provide normal support for the mobile part;
b. the support element holds the bearing shoe a predetermined distance from the first bearing surface when the main bearing device is supporting; and
c. the supply means includes control means which responds to the position of the mobile part and serves to permit and interrupt the delivery of hydraulic fluid to said pocket and pressure chamber depending upon whether the spacing between the first bearing surface and the shoe is less or greater than a preselected distance,
d. whereby the bearing shoe serves as a counter-bearing for the main bearing.

* * * * *